United States Patent
Dusterhoft et al.

(10) Patent No.: US 8,371,382 B2
(45) Date of Patent: Feb. 12, 2013

(54) METHODS RELATING TO IMPROVED STIMULATION TREATMENTS AND STRENGTHENING FRACTURES IN SUBTERRANEAN FORMATIONS

(75) Inventors: Ronald G. Dusterhoft, Katy, TX (US); Jimmie D. Weaver, Duncan, OK (US); Richard D. Rickman, Duncan, OK (US); Michael A. McCabe, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 392 days.

(21) Appl. No.: 12/826,426

(22) Filed: Jun. 29, 2010

(65) Prior Publication Data

US 2011/0240296 A1 Oct. 6, 2011

Related U.S. Application Data

(63) Continuation-in-part of application No. 12/751,770, filed on Mar. 31, 2010.

(51) Int. Cl.
*E21B 43/267* (2006.01)
*E21B 33/138* (2006.01)
(52) U.S. Cl. ............... 166/281; 166/280.1; 166/283; 166/308.3
(58) Field of Classification Search .................. None
See application file for complete search history.

(56) References Cited

U.S. PATENT DOCUMENTS

| 3,880,764 A | 4/1975 | Donham |
| 2006/0073980 A1 | 4/2006 | Brannon et al. |
| 2008/0093073 A1 | 4/2008 | Bustos et al. |
| 2009/0114390 A1 | 5/2009 | You |
| 2010/0224361 A1* | 9/2010 | Pope et al. ............... 166/250.02 |
| 2011/0240291 A1 | 10/2011 | Rickman et al. |
| 2011/0240292 A1 | 10/2011 | Dusterhoft et al. |

FOREIGN PATENT DOCUMENTS

| WO | WO 2008/118242 A1 | 10/2008 |
| WO | WO 2009/150402 A2 | 12/2009 |
| WO | WO 2009/150402 A3 | 12/2009 |
| WO | WO 2010/041033 A2 | 4/2010 |
| WO | WO 2010/041033 A3 | 4/2010 |

OTHER PUBLICATIONS

International Search Report and Written Opinion for PCT/GB2011/000973 dated Sep. 29, 2011.
Wen et al., "The Effect of Proppant Embedment Upon the Long-Term Conductivity of Fractures," ScienceDirect, Journal of Petroleum Science and Engineering, 55 (2007) 221-227.
International Search Report and Written Opinion for PCT/GB2011/000484 dated May 30, 2011.

* cited by examiner

*Primary Examiner* — Zakiya W Bates
(74) *Attorney, Agent, or Firm* — Robert A. Kent; McDermott Will & Emery LLP (57) ABSTRACT

Of the many methods provided herein, one method comprises: providing at least one fracture in a subterranean formation that comprises tight gas, a shale, a clay, and/or a coal bed; providing a plasticity modification fluid that comprises an aqueous fluid and an alkaline embrittlement modification agent; placing the plasticity modification fluid into the fracture in the subterranean formation; and embrittling at least one fracture face of the fracture to form an embrittled fracture face.

19 Claims, 7 Drawing Sheets

METHODS RELATING TO IMPROVED STIMULATION TREATMENTS AND STRENGTHENING FRACTURES IN SUBTERRANEAN FORMATIONS

CROSS-REFERENCE TO RELATED APPLICATIONS

This application is a continuation-in-part of co-pending U.S. patent application Ser. No. 12/751,770, filed Mar. 31, 2010, which is herein incorporated by reference in its entirety.

BACKGROUND

The present invention relates to methods of treating a subterranean formation, and, at least in some embodiments, to methods of strengthening and improving the conductivity of fractures in subterranean formations having low inherent permeability that comprise tight gas, shales, clays, and/or coal beds.

Subterranean formations comprising tight gas, shales, clays, and/or coal beds generally have a low permeability. As used herein, the term "tight gas" refers to gas found in sedimentary rock that is cemented together so that flow rates are relatively very low. As used herein, the term "shale" refers to a sedimentary rock formed from the consolidation of fine clay and silt materials into laminated, thin bedding planes. As used herein, the term "clay" refers to a rock that may be comprised of, inter alia, one or more types of clay, including, but not limited to kaolinite, montmorillonite/smectite, illite, chlorite, and any mixture thereof. The clay content of the formations may be a single species of a clay mineral or several species, including the mixed-layer types of clay. As used herein, "coal bed" refers to a rock formation that may be comprised of, inter alia, one or more types of coal, including, but not limited to, peat, lignite, sub-bituminous coal, bituminous coal, anthracite, and graphite. Traditionally, these unconventional formations have been viewed as having non-productive rock by the petroleum industry because they are "tight" and have low permeability. Also, they require specialized drilling and completion technologies. Recently, however, there have been a number of significant natural gas discoveries in such formations, which in this economic climate, have warranted production.

Fractures are the primary conduit for the production of oil and gas. In these applications, most of the effective porosity may be limited to the fracture network within the formation, but some gas may have also been trapped in the formation matrix, the various layers of rock, or in the bedding planes. To make these types of formations economical, fracturing/stimulation treatments often are advisable to connect the natural microfractures in the formation as well as create new fractures. Creating or enhancing the conductivity of the formation should increase the production of gas from the formation. In other words, the more surface area that can be exposed within the formation through fracturing the formation, the better the economics and efficiency will be on a given well.

Although the combination of horizontal drilling and hydraulic fracturing has proven to be an effective means to stimulate gas production from some shale reservoirs, the longer term production results are often declining at rates far greater than expected leading to lower ultimate recoveries and questionable economic viability. In some instances, based on initial high productivity, many operators have drilled large numbers of wells only to find that these production rates cannot be maintained at adequate levels for long term economic viability. One cause that has been identified a contributing factor to these rapid declines in well productivity is the inability of such formations to sustain high fracture conductivity under high draw down pressures.

Fracturing such formations is typically accomplished by using linear or crosslinked gels or fresh or salt water fluids comprising a friction reduction additive. These water type fracturing treatments are often referred to as "slick water fracs." The use of high rate water fracturing techniques has been extensively used in shale stimulations in combination with micro-seismic fracture mapping to try and optimize these stimulation treatments in ultra-low permeability, naturally fractured reservoirs. In such treatments, often the primary objective is to create or connect a complex fracture network, sometimes called a dendritic network, so hydrocarbons may be transported from the reservoir to the well bore in economic quantities. Achieving a highly conductive channel that extends deep into the reservoir along a complex fracture network can be difficult to achieve using conventional techniques. One key problem is that it is difficult to establish a sufficient fracture width in secondary or branch fractures that are perpendicular to the maximum horizontal stress. In this situation, the maximum horizontal stress is acting to restrict the fracture width that can be achieved making it difficult to achieve good proppant placement in these branches. Best results have been observed when fracture mapping indicates the presence of a dendritic network that maximizes the total area of the formation exposed to the fracture.

Conductivity of the fractures may be achieved by placing low concentrations of proppant into the fractures while continuing to inject water at very high flow rates. In many cases, friction reducers are beneficial to maximize the flow rates without exceeding the maximum surface treating pressures. Unfortunately, the combination of low proppant concentrations and low viscosity treatment fluids makes it difficult to achieve good proppant transport in a complex fracture environment. As a result, much of the exposed fracture area may not have sufficient proppant concentration or conductivity to remain in fluid communication with the well bore after the well has been placed on production.

Also problematic in these fractures and fracture networks is the closure/healing of these fractures and or partial or complete proppant embedment resulting from increased closure stress due to high draw down pressures during production as well as potential softening of the formation after exposure to the treatment fluids. Many shales and/or clays are reactive with fresh water, resulting in ion exchange and absorption of aqueous fluids leading to embrittlement of the rock in the formation. The term "embrittlement" and its derivatives as used herein refers to a process by which the properties of a material are changed through a chemical interaction such that a material that originally behaves in a ductile or plastic manner is transformed to a material that behaves in a more brittle manner. Additionally, such degradation may substantially decrease the stability of fractures in the formation, which may cause a decrease in the productivity of the well.

Figure 1:
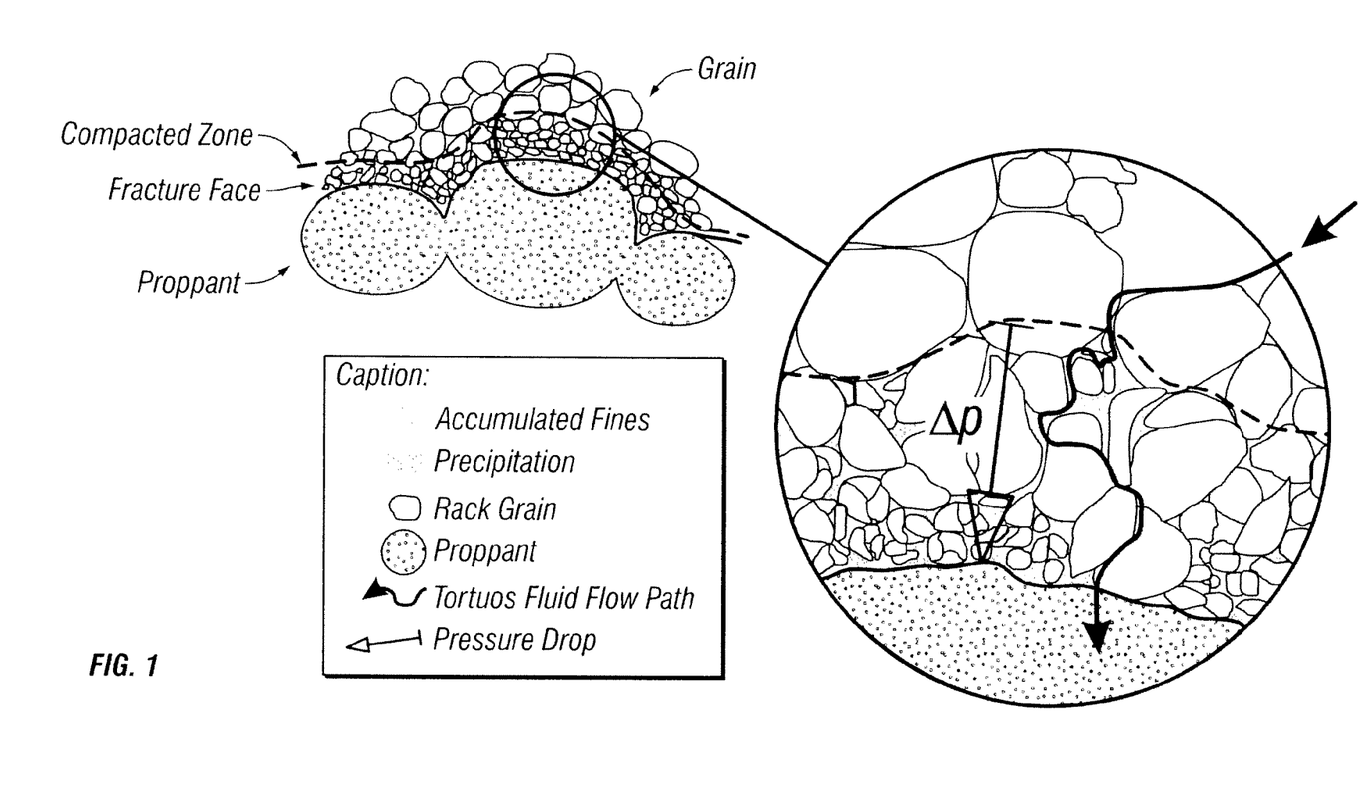
FIG. 1 illustrates a rock formation showing proppant embedment.
Figure 2:
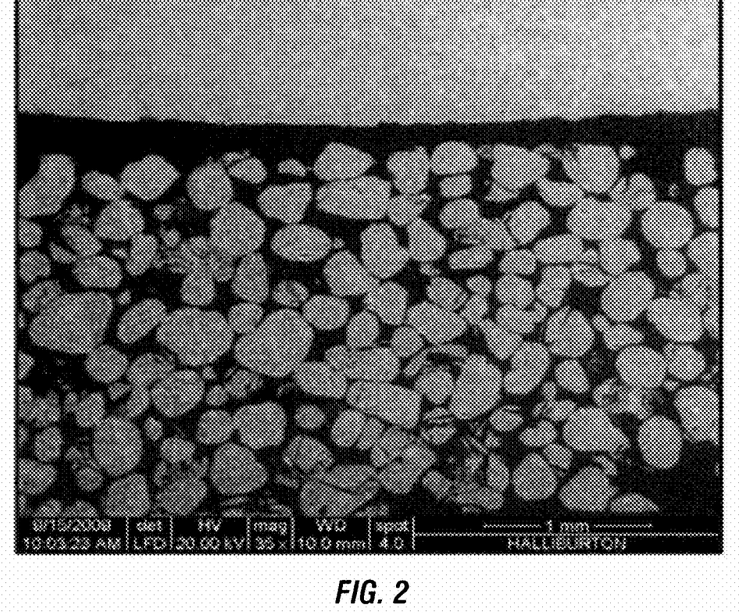
FIG. 2 illustrates proppant embedment in a fracture.
Figure 3:
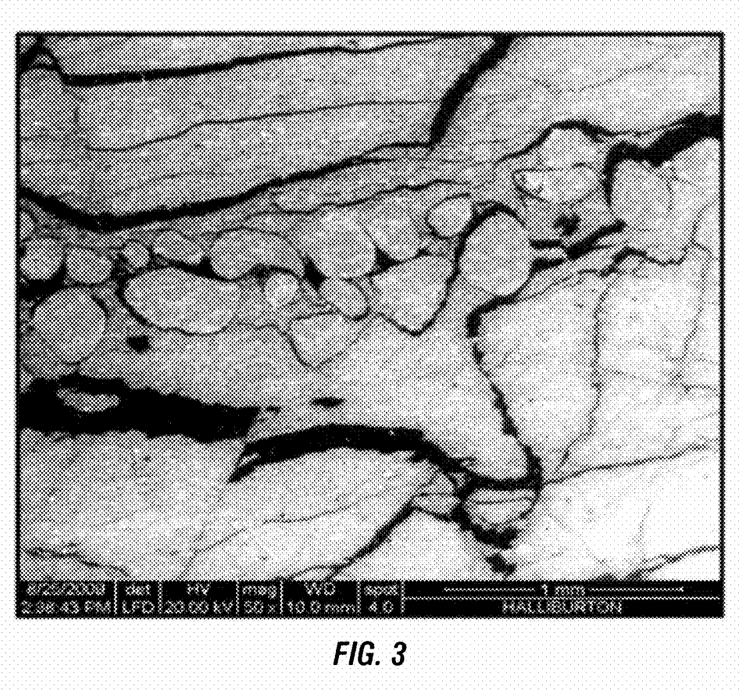
FIG. 3 illustrates a near 100% proppant embedment in a fracture.

This degradation also leads to proppant embedment. Proppant embedment is believed to cause a reduction in fracture width and conductivity, and may be caused by a compression failure within the fracture. Unlike in well-consolidated formations, proppant embedment in these types of tight formations can be as high as several proppant-grain diameters, e.g., in weakly consolidated sandstones. FIG. 1 illustrates the proppant embedment phenomena. FIG. 2 is a computer screen image illustrating the phenomena. Proppant embedment can reduce fracture width from about 10% to about 60% or more, for example almost 100%, when there is a very low concentration of proppant in the fracture, with subsequent reduction in productivity from oil and gas wells. FIG. 3 illustrates a fracture having near 100% embedment. When this occurs, the pathway for hydrocarbons to the well bore may become obstructed, and production may be impaired.

Clays can swell, disperse, disintegrate or otherwise become disrupted in the presence of foreign aqueous fluids. The swelling or dispersion of clays can significantly reduce the permeability of a formation. The use of salts as formation control additives has not eliminated formation damage as a result of permeability reduction, but can reduce or minimize such damage. A clay which swells is not limited to expanding lattice-type clays but includes all those clays which can increase in bulk volume with or without dispersing, degrading, or otherwise becoming disrupted, when placed in contact with foreign aqueous solutions such as water, and certain brines. Certain clays can also disperse, degrade, or otherwise become disrupted without swelling in the presence of foreign aqueous solutions such as water, certain brines, and emulsions containing water or certain brines. Some clays, in the presence of foreign aqueous solutions, will expand and be disrupted to the extent that they become unconsolidated and produce particles which migrate into a borehole. Formations which consist largely of clay upon absorbing water in a confined space can develop pressures on the order of several thousands of pounds per square inch.

The clay materials defined above occur as minute, plate-like, tube-like and/or fiber-like particles having an extremely large surface area as compared to an equivalent quantity of a granular material such as sand. This combination of small size and large surface area results in a high surface energy with attendant unusual surface properties and extreme affinity for surface-active agents. The structure of some of these clays, for example, montmorillonite, can be pictured as a stack of sheet-like three-layer lattice units which are weakly bonded to each other and which are expanded in the "c" crystallographic direction by water or other substances which can penetrate between the sheets and separate them.

Moreover, the fine aggregate that composes shales and/or clays can pose problems if exposed to high stresses. For example, under high stress, shale can mechanically fail, resulting in the generation of fine clay materials that can be highly mobile in produced fluids. In situations where there is high pore pressure and very little permeability, when the system is exposed to a low pressure environment, the surrounding formation can almost fluidize solid. For example, it is believed that shale, when exposed to high stress and pore pressure conditions, can transform from a solid into a semi-liquid material causing it to intrude into a proppant pack. This can result in shale intrusion, well bore sloughing and large quantities of solids production, plugging screens or filling separators on the surface.

In some formations, the bonding between bedding plane layers may be weaker than the bonding between particles in a given layer. In such formations, the bedding plane may represent a weakness susceptible to mechanical failure or separation. To combat these problems, brines are often used that contain high ion concentration so that ion exchange will not occur and the reactivity of the shales and/or clays will be reduced. In extreme cases, oil-based fluids may be used to avoid exposing the shales and/or clays to aqueous fluids.

SUMMARY

The present invention relates to methods of treating a subterranean formation, and, at least in some embodiments, to methods of strengthening and improving the conductivity of fractures in subterranean formations having low inherent permeability that comprise tight gas, shales, clays, and/or coal beds.

In one embodiment, the present invention provides a method comprising: providing at least one fracture in a subterranean formation that comprises tight gas, a shale, a clay, and/or a coal bed; providing a plasticity modification fluid that comprises an aqueous fluid and an alkaline embrittlement modification agent; placing the plasticity modification fluid into the fracture in the subterranean formation; and embrittling at least one fracture face of the fracture to form an embrittled fracture face.

In one embodiment, the present invention provides a method comprising: providing a subterranean formation that comprises tight gas, a shale, a clay, and/or a coal bed; providing a plasticity modification fluid comprising an embrittlement modification agent; placing the plasticity modification fluid into a subterranean formation so as to form a treated portion of the formation; and embrittling a portion of the treated portion of the formation so that the treated portion has a retained hardness factor of at least 65% when tested using a Modified Brinell Hardness Test.

In one embodiment, the present invention provides a method comprising: providing a selected portion of a subterranean formation that comprises tight gas, a shale, a clay, and/or a coal bed and having a first Young's modulus; providing a plasticity modification fluid comprising an embrittlement modification agent; placing the plasticity modification fluid into the subterranean formation so as to treat the portion of the subterranean formation; and embrittling the portion of the treated portion of the formation so that the treated portion has a second Young's modulus after treatment that is higher than the first Young's modulus.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

The present invention relates to methods of treating a subterranean formation, and, at least in some embodiments, to methods of strengthening and improving the conductivity of fractures in subterranean formations having low inherent permeability that comprise tight gas, shales, clays, and/or coal beds.

Of the many advantages of the present invention, only some of which are discussed or eluded to herein, one advantage is that these methods can minimize proppant embedment and fracture closure by modifying the surface of the fracture faces in the formations such that it increases or maintains its relative hardness after exposure to treating fluids. It is believed that this is achieved through a chemical alteration of the mechanical phenomena at the fracture face, which results in a prevention of the extrusion or intrusion of the rock surrounding the formation into the proppant pack in the fracture. This is believed to reduce proppant embedment, shale migration, and the like. Moreover, it is possible that the fractures in tight gas, shales, clays, and/or coal beds may be strengthened by use of the methods of the present invention, which may lead to increased productivity of a well in the formation, by embrittling the rock surrounding the fractures. Moreover, strengthening or hardening of the rock can be accomplished by the removal of trapped water within the grain structure of the rock. Removal of this water can result in a reduction in volume of the rock which essentially causes the increase in strength. Reducing the volume of the rock is one possible means of increasing the effective conductivity or permeability of micro fractures where the fluid leaks into. Additionally, the presence of cations may enhance this effect, and can be present either naturally in the formation or added to the formation with a treatment fluid. The methods of the present invention may be especially suitable for use in conjunction with water fracturing methods, such as slickwater fracs.

Additional erosion-related methods of the present invention may be used to improve the conductivity of fractures in subterranean formations having low inherent permeability that comprise tight gas, shales, clays, and/or coal beds. These erosion-related methods may be especially useful in shale formations that are susceptible to fracture-closer due to the plastic behavior of the rock under high stress conditions. At least theoretically, the erosion-related embodiments disclosed herein should produce a complex fracture system extending from the wellbore into the reservoir, the complex fracture system having eroded and propped flow channels along an embrittled fracture face. The combination of the eroded and propped flow channels and the embrittled fracture faces should ensure sustained long term conductivity to the wellbore from the formation having low inherent permeability.

These erosion-related methods are able to manipulate the erosion effects along the fracture faces and at the fracture joints to create high conductivity channels that are capable of penetrating deep into the reservoir along complex paths, leading to improved conductivity in the formation through the manipulation of natural variations and bedding plains in the formation. This improved conductivity should be maintainable for a longer teini, relative to conventional techniques. The term "erosion" and its derivatives as used herein refers to the process of denudation of rocks, including physical, chemical and biological breakdown and transportation. This improved conductivity is manifested in the creation of channels through the fracture network. These channels may be formed by the injection velocity of the fluid in the near-wellbore region of the formation. The channels are believed to enhance the stimulation effect of the treatment. An erosion agent that aids in plasticizing or weakening the rock at the fracture face may be used, e.g., to make the formation more susceptible to erosion to enhance the creation of these channels. It is believed that the erosion techniques presented by the present invention may provide a more efficient means of establishing and maintaining conductivity at joints where fractures intersect where it can be difficult to place proppant in conventional fracturing treatments.

After these channels have been created, a plasticity modification fluid comprising an embrittlement modification agent may be employed to embrittle the exposed fracture surfaces to help achieve the maximum long term fracture conductivity. Additionally, proppant can be injected with these plasticity modification fluids as a secondary means of maintaining the conductivity of the fractures to maintain an open flow channel.

Another potential advantage associated with these methods is that solids that are released from the fracture face during this step of the stimulation process can be transported more deeply into the fracture network to minimize risk of the solids flowing back to the wellbore.

In some embodiments, the erosion-related embodiments comprise methods that include a method comprising: providing an aqueous-based fracturing fluid; placing the aqueous-based fracturing fluid into a subterranean formation; placing an erosion agent in the aqueous-based fracturing fluid and/or the subterranean formation; allowing a channel to form within a fracture network in the subterranean formation; providing a plasticity modification fluid that comprises an aqueous fluid and an alkaline embrittlement modification agent; placing the plasticity modification fluid into a fracture in the fracture network in the subterranean formation; and embrittling at least one fracture face of the fracture to form an embrittled fracture face.

Suitable aqueous-based fracturing fluids for inclusion in the erosion-related embodiments may include low efficiency, low viscosity fluids. Examples of such suitable fracturing fluids may include slick-water, water, carbon dioxide, nitrogen, methane, propane, butane, other gas-based fluids, and any combination thereof.

Once an aqueous-based fracturing fluid has been provided, it may be injected into a portion of a subterranean folination having low inherent permeability and that comprises tight gas, shales, clays, and/or coal beds. This should establish leak-off into the complex natural fracture system. If enough time is allowed to pass, a suitable fracture network should form.

An erosion agent may then be added to the aqueous-based fracturing fluid to increase the plasticity or weaken the formation along the fracture faces of the fractures in the fracture network. During such time, a high rate of injection of the fracturing fluid may be maintained, if desired. In some embodiments, multiple scouring stages may be employed by adding fine erosive solids (e.g., sand particulates, gravel, and other suitable particulates) to the aqueous-based fracturing fluid stream to maximize the erosion of the fracture surfaces. Optionally, flush stages of an untreated fluid (e.g., untreated water) can be incorporated as well to help flush the generated solids away from the wellbore while keeping the conductive channels open.

For the final stages of treatment, a plasticity modification fluid comprising an embrittlement agent may be incorporated within the fluid to embrittle the exposed fractures faces. Examples of such fluids are described herein.

At this stage, optionally, proppant may be injected with the plasticity modification fluid to provide mechanical support to keep the fractures and channels open after the well has been placed on production.

In some embodiments, the erosion agent and the plasticity modification agent are added sequentially to the aqueous-based fracturing fluid before or at the point of injection of the aqueous-based fracturing fluid into the subterranean formation.

As stated above, the term "embrittlement" and its derivatives as used herein is used to explain a process by which the properties of a material are changed through a chemical interaction such that a material that behaves in a ductile or plastic manner is transformed to a material that behaves in a more hard or brittle manner. This may be determined by examining the Young's modulus and the Poisson's ratio of the natural rock before treatment. If the rock has become embrittled, the Young's modulus should be higher and the Poisson's ratio should be lower as compared to the natural rock before treatment.

Young's modulus is the ratio of stress, which has units of pressure, to strain, which is dimensionless; therefore Young's modulus itself has units of pressure. The SI unit of modulus of elasticity (E, or less commonly Y) is the pascal (Pa or $N/m^2$); the practical units are megapascals (MPa or $N/mm^2$) or gigapascals (GPa or $kN/mm^2$). In United States customary units, it is expressed as pounds (force) per square inch (psi). Young's modulus, E, can be calculated by dividing the tensile stress by the tensile strain:

$$E \equiv \frac{\text{tensile stress}}{\text{tensile strain}} \quad \text{Equation 1}$$
$$= \frac{\sigma}{\varepsilon}$$
$$= \frac{F/A_0}{\Delta L/L_0}$$
$$= \frac{FL_0}{A_0 \Delta L}$$

Where:
E is the Young's modulus (modulus of elasticity);
F is the force applied to the object;
$A_0$ is the original cross-sectional area through which the force is applied;
$\Delta L$ is the amount by which the length of the object changes; and
$L_0$ is the original length of the object.

Poisson's ratio (v) is the ratio, when a sample object is stretched, of the contraction or transverse strain (perpendicular to the applied load), to the extension or axial strain (in the direction of the applied load).

$$v = -\frac{\varepsilon_{trans}}{\varepsilon_{axial}} \quad \text{Equation 2}$$
$$= -\frac{\varepsilon_x}{\varepsilon_y}$$

Where:
v is the resulting Poisson's ratio,
$\varepsilon_{trans}$ transverse strain (negative for axial tension, positive for axial compression); and
$\varepsilon_{axial}$ is axial strain (positive for axial tension, negative for axial compression).

In some embodiments, the present invention provides methods that include a method comprising: providing a selected portion of a subterranean formation that comprises tight gas, a shale, a clay, and/or a coal bed and having a first Young's modulus and a first Poisson's ratio; providing a plasticity modification fluid comprising an embrittlement modification agent; placing the plasticity modification fluid into the subterranean formation so as to treat the portion of the subterranean formation; and embrittling the portion of the treated portion of the formation so that the treated portion has a second Young's modulus after treatment that is higher than the first Young's modulus and a second Poisson's ratio after treatment that is lower than the first Poisson's ratio.

Figure 4:
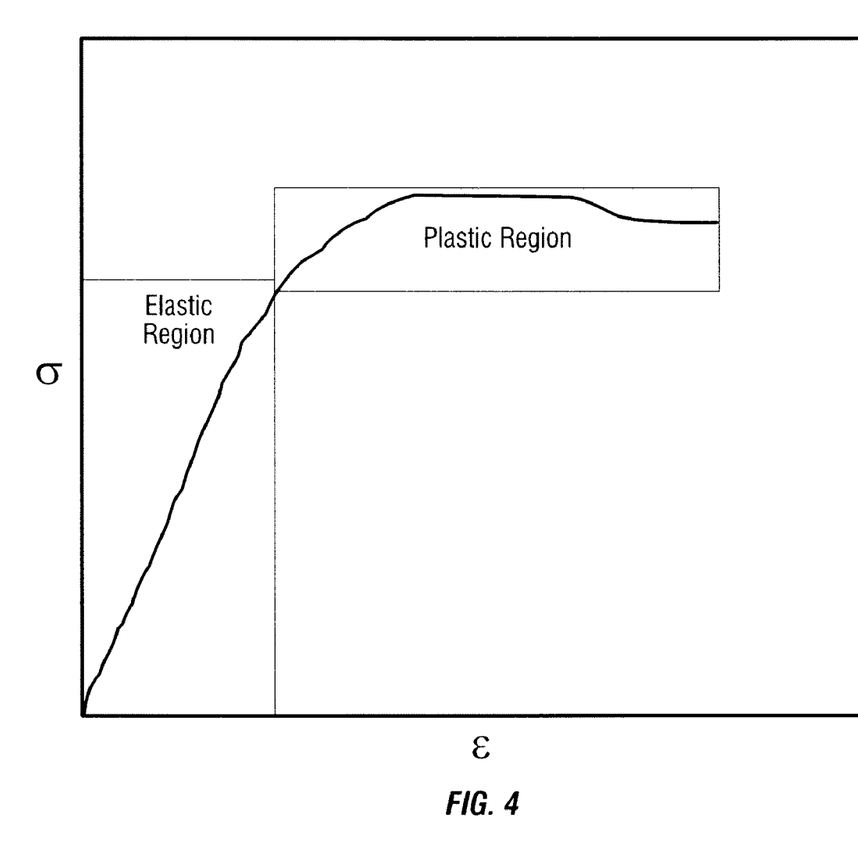
FIG. 4 illustrates a typical stress strain curve.
Figure 5:
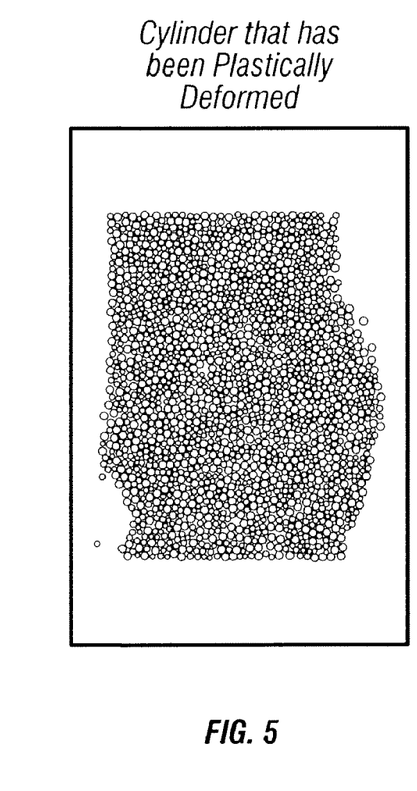
FIG. 5 illustrates a sample showing plastic deformation in a compression test.

It is believed that ductile materials are materials that can be characterized by a very large region on the stress strain curve where the material can be deformed plastically once its yield stress is exceeded. FIG. 4 shows a typical stress strain curve for a material that behaves in a ductile manner; this curve has two distinct regions, a linear elastic region followed by a plastic region. In the plastic region, the shape of a specimen can be changed significantly without completely failing or breaking. An example stress-strain curve and a cylinder that has been plastically failed is shown in FIG. 5.

Figure 6:
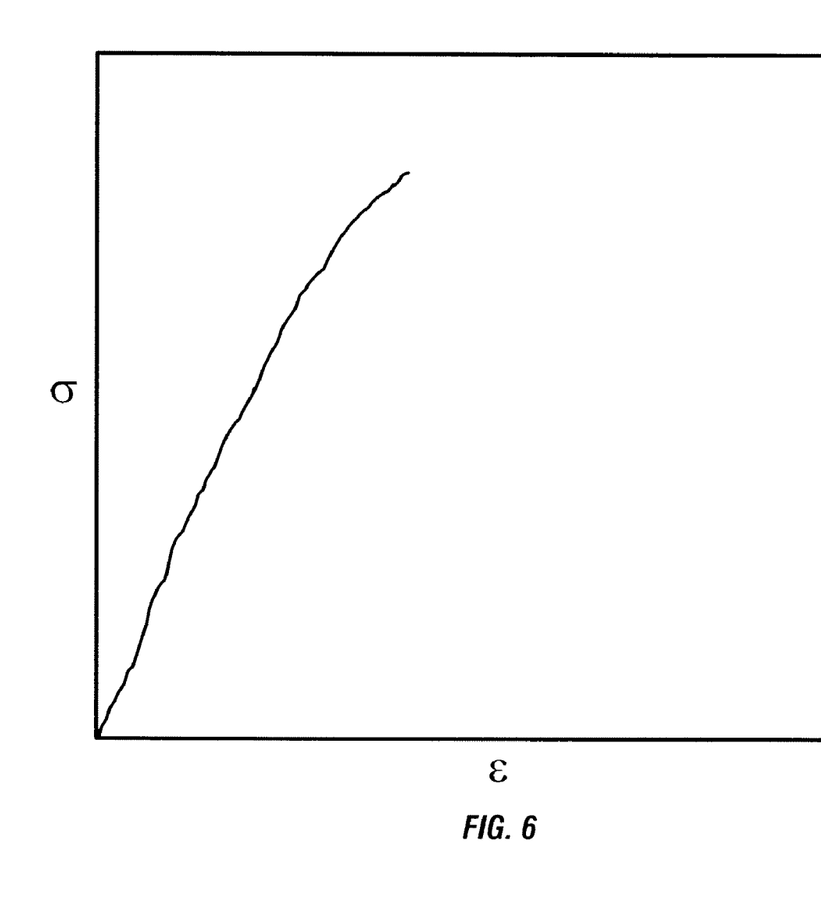
FIG. 6 shows a typical stress strain curve.
Figure 7:
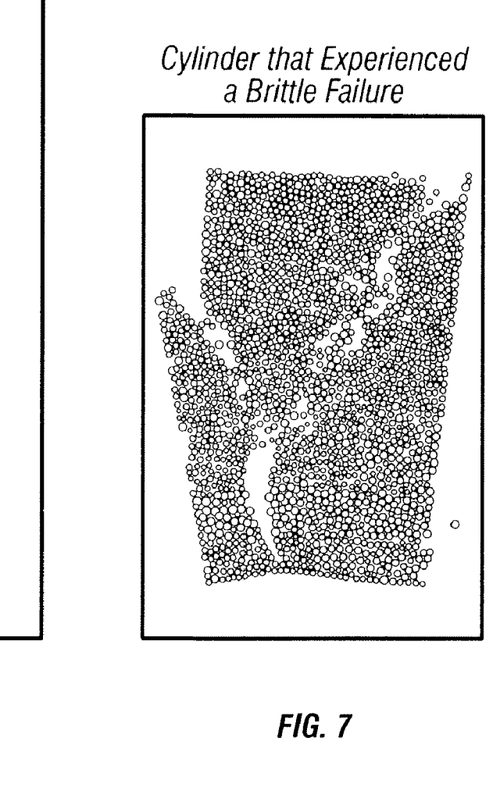
FIG. 7 illustrates a cylinder that has undergone a brittle failure.

It is believed that brittle materials behave very differently and will fail before there is any significant deformation. FIG. 6 shows a typical stress strain curve for a brittle material and FIG. 7 shows a cylinder that has undergone a brittle failure. In this stress-strain curve, there is little or no plastic region.

Figure 8:
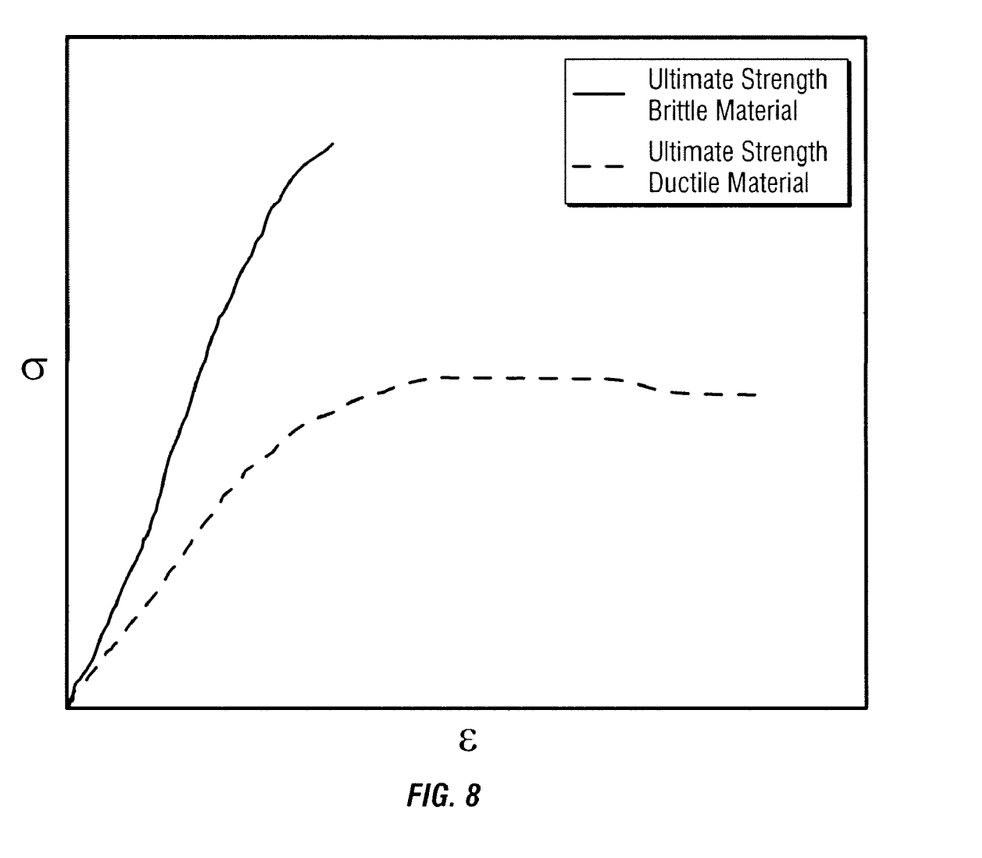
FIG. 8 shows a stress-strain plot showing how a ductile material when transformed to a brittle material will be strengthened as it becomes more brittle.

During the process of embrittlement in ductile subterranean formation such as a shale the folination material is transformed from a ductile material that can be failed plastically under stress to a brittle material that does not deform plastically. To achieve this behavior from a single material, an alteration of the nature of the formation material is advisable. To achieve the brittle behavior, the ultimate strength of the material will have to increase significantly as shown in FIG. 8.

From an embedment stand point, it is evident that when the formation behaves in a ductile manner, once the yield stress is exceeded the formation will plastically fail allowing the proppant grain to be embedded deep into the formation material. In a situation when the formation is brittle, the formation will not plastically deform meaning that there will be no embedment of the proppant into the surface of the formation material. The combination of changing to a brittle material and strengthening the formation allows more stress to be applied without loss of conductivity due to embedment.

In some embodiments, the present invention provides methods that include a method comprising: providing at least one fracture in a subterranean formation that comprises tight gas, a shale, a clay, and/or a coal bed; providing a plasticity modification fluid that comprises an aqueous fluid and an embrittlement modification agent; placing the plasticity modification fluid into the fracture in the subterranean formation; and embrittling at least one fracture face of the fracture to prevent clay extrusion of the formation into the fracture.

The term "plasticity modification fluid" as used herein refers to a fluid that has a high pH at downhole conditions that is capable of altering the mechanical properties of the surrounding rock at the fracture face, which results in a prevention of the extrusion or intrusion of the rock into the proppant pack in the fracture.

The term "erosion agent" refers to a fluid agent that reacts with the rock in the formation, for example, to destabilize or weaken the rock matrix making it more susceptible to erosion. Examples include chemicals that cause clays to swell resulting in at least some weakening or chemicals that chemically remove some mineral components from the rock causing at least some weakening.

The term "fracture face" as used herein refers to a face of a crack or surface of breakage within rock.

The term "clay extrusion" herein refers to the mechanical phenomena of the rock in a subterranean formation surrounding a fracture intruding into the fracture, and thus, discombobulating the fracture face and/or enveloping the proppant in the fracture. This may include the migration or intrusion of clay from the surrounding rock into the fracture.

The term "substantially prevent" as used herein means to prevent to a measurable extent, but not necessarily to completely prevent.

The plasticity modification fluids of the present invention comprise an aqueous fluid and an embrittlement modification agent, and therefore, have a high pH. The pH range of the fluids is preferably 10 or above at downhole conditions. It is believed that these plasticity modification fluids prevent the rock surrounding a fracture from migrating into the proppant pack or open fracture, which would otherwise plug the fracture. Thus, the plasticity modification fluids are chemical fluids that counteract the mechanical phenomena to prevent the extrusion mechanism (e.g., through embrittling the rock) and the resultant proppant embedment or fracture closure. This is believed to affect the basal spacing in the surrounding clays.

Suitable aqueous fluids include any aqueous fluid that is compatible with a high pH including fresh water, brines, and the like. The concentration of the aqueous fluid in the plasticity modification fluids of the present invention will depend on the desired pH (e.g., 10 or above at downhole conditions) of the fluid given the factors involved in the treatment.

The embrittlement modification agents for use in the present invention comprise high alkaline materials. Suitable examples include, but are not limited to, lithium hydroxide, sodium hydroxide, potassium hydroxide, rubidium hydroxide, calcium hydroxide, strontium hydroxide, barium hydroxide, cesium hydroxide, sodium carbonate, lime, amines, ammonia, borates, Lewis bases, other strong bases, and any derivative or combination thereof. The concentration of the embrittlement modification agent in the plasticity modification fluids of the present invention will depend on the desired pH (e.g., about 10 or above at downhole conditions) of the fluid given the factors involved in the treatment. The effect of the plasticity modification fluids of the present invention is surprising because past studies have found that utilizing bases, such as sodium hydroxide, to stabilize clays has proven relatively ineffective in that it was believed that they can promote significant formation permeability damage, and in some instances, actually increase the fresh water sensitivity of formation clays.

Optionally, the plasticity modification fluids of the present invention may comprise cationic additives, such as cationic polymers and cationic organic additives, to enhance the plasticity modification. Divalent cationic additives may be more stable. If used, such additives may be used in an amount of about 0.1% to about 1% by weight of the fluid. Hydroxy aluminum and zirconium oxychloride are examples. Other examples include the following additives available from Halliburton Energy Services, Inc. in Duncan, Okla.: "CLAYSTA XP," "CLAYSTA FS," "CLAYFIX-II," and "CLAYFIX-II PLUS." Suitable additives are described in the following patents, each of which are hereby incorporated by reference, U.S. Pat. Nos. 5,097,094, 4,974,678, 4,424,076, and 4,366,071.

Optionally, the plasticity modification fluids of the present invention may comprise salts such as salts of lithium, sodium, potassium, rubidium, calcium, strontium, barium, cesium, sodium, potassium chloride, calcium chloride, magnesium, and manganese. The ion exchange resulting from the presence of the salt is useful in aiding in the shrinkage of the rock.

Optionally, including surfactants in the plasticity modification fluids may facilitate ultra low surface tensions and allow these fluids to penetrate into a matrix or micro fracture more easily.

Suitable erosion agents may include fresh water, brines, slightly acidic fluids, and any combination thereof. Preferably, the erosion agent is slightly acidic.

In some embodiments, the plasticity modification fluid may be placed in a subterranean formation as a result of a fracturing treatment. The process of hydraulic fracturing creates the maximum differential pressure helping to make these fluids penetrate more readily into the formation matrix or micro fractures.

Any suitable fracturing fluid and method for the subterranean formation may be used in conjunction with the present invention. In some embodiments, the methods of the present invention may be very well suited for applications using very inefficient fluids or fluids that have little fluid loss control, such as linear gelled fluids or ungelled fluids such as water. Examples of such suitable fracturing fluids may include slickwater, water, carbon dioxide, nitrogen, methane, propane, butane, other gas-based fluids, and any combination thereof. These fluids do not tend to form filter-cakes at the formation surface, and therefore, are capable of leaking off more easily into a tight formation matrix or micro fracture. Crosslinked fluids are also suitable, but because of their improved efficiency and controlled fluid loss, they may not tend to invade as deeply into the formation or micro fractures.

In one aspect, the invention provides a method comprising: fracturing a subterranean formation that comprises tight gas, a shale, a clay, and/or a coal bed to form at least one fracture therein; providing a plasticity modification fluid that comprises an aqueous fluid and an alkaline plasticity modification agent; placing the plasticity modification fluid into the fracture in the subterranean formation; and allowing the plasticity modification fluid to substantially prevent clay extrusion into the fracture In one aspect, the invention provides a method comprising: providing a subterranean formation that comprises tight gas, a shale, a clay, and/or a coal bed; providing a plasticity modification fluid comprising an alkaline plasticity modification agent; placing the plasticity modification fluid into a subterranean formation so as to form a treated portion of the formation; and allowing a portion of the treated portion of the formation to dehydrate to have a retained hardness factor of at least 65% when tested using a Brinell Hardness Test that is current as of the filing date of this application.

In one aspect, the invention provides a sample of a shale rock having a greater than 65% retained hardness when tested using a Brinell Hardness Test (that is current as of the filing date of this application) after treatment with a plasticity modification fluid that comprises an alkaline plasticity modification agent.

In one embodiment, the present invention provides a method of treating a subterranean formation comprising the following steps. Placing a treatment fluid into a well bore that penetrates a subterranean formation, wherein the subterranean formation comprises at least one selected from the group consisting of: a shale, a clay, a coal bed, and a combination thereof. Applying a pressure pulse to the treatment fluid.

In another embodiment, a method of treating a subterranean formation comprises the following steps. Placing a treatment fluid into a well bore that penetrates a subterranean formation, wherein the subterranean formation comprises at least one selected from the group consisting of: a shale, a clay, a coal bed, and a combination thereof, and applying a pressure pulse that exceeds the formation fracture gradient to the treatment fluid.

In another embodiment, the present invention provides a method comprising: providing an aqueous-based fracturing fluid; placing the aqueous-based fracturing fluid into a subterranean formation; placing an erosion agent in the aqueous-based fracturing fluid and/or the subterranean formation; allowing a channel to form within a fracture network in the subterranean formation; providing a plasticity modification fluid that comprises an aqueous fluid and an alkaline embrittlement modification agent; placing the plasticity modification fluid into a fracture in the fracture network in the subterranean formation; and embrittling at least one fracture face of the fracture to form an embrittled fracture face.

In another embodiment, the present invention provides a method comprising: providing a selected portion of a subterranean formation that comprises tight gas, a shale, a clay, and/or a coal bed and having a first Young's modulus; providing an aqueous-based fracturing fluid; placing the aqueous-based fracturing fluid into the portion of the subterranean formation; placing an erosion agent in the aqueous-based fracturing fluid and/or the portion of the subterranean formation; allowing a channel to form within a fracture network in the portion of the subterranean formation; providing a plasticity modification fluid comprising an embrittlement modification agent; placing the plasticity modification fluid into the portion of the subterranean formation so as to treat the portion of the subterranean formation; and embrittling at least one fracture face in the portion of the treated portion of the formation so that the treated portion has a second Young's modulus after treatment that is higher than the first Young's modulus.

In another embodiment, the present invention provides a method comprising: providing a selected portion of a subterranean formation that comprises tight gas, a shale, a clay, and/or a coal bed and having a first Young's modulus; providing an aqueous-based fracturing fluid; placing the aqueous-based fracturing fluid into the portion of the subterranean formation; placing an erosion agent in the aqueous-based fracturing fluid and/or the portion of the subterranean formation; allowing a channel to form within a fracture network in the portion of the subterranean formation; providing a plasticity modification fluid comprising an embrittlement modification agent; placing the plasticity modification fluid into the portion of the subterranean formation so as to treat the portion of the subterranean formation; and embrittling at least one fracture face in the portion of the treated portion of the formation so that the treated portion has a second Young's modulus after treatment that is higher than the first Young's modulus.

To facilitate a better understanding of the present invention, the following examples of certain aspects of some embodiments are given. In no way should the following examples be read to limit, or define, the scope of the invention.

EXAMPLES

A modified version of the Brinell Hardness Test (as defined below), referred to herein as a Modified Brinell Hardness Test, can be used to measure the hardness of samples of subterranean formations, in terms of the Brinell Hardness Number ("BHN") relative to each other, or of formation samples before and after certain treatments such as exposure to various fluids. The Brinell Hardness Test, thus, is a measure of the resistance of the rock to indentation, which has direct applicability to proppant embedment problems.

The Brinell Hardness Test method involves indenting the test material with a 10 mm diameter hardened steel or carbide ball subjected to a load of 3000 kg. For softer materials the load can be reduced to 1500 kg or 500 kg to avoid excessive indentation. The full load is normally applied for 10 to 15 seconds in the case of iron and steel and for at least 30 seconds in the case of other metals. The diameter of the indentation left in the test material is measured with a low powered microscope. The BHN is calculated by dividing the load applied by the surface area of the indentation. Formula 3 shows the calculation for the method:

$$BHN = F/[(\Pi/2 \cdot D)(D - (\sqrt{(D^2 - D^2_i)}))]$$

Figure 9:
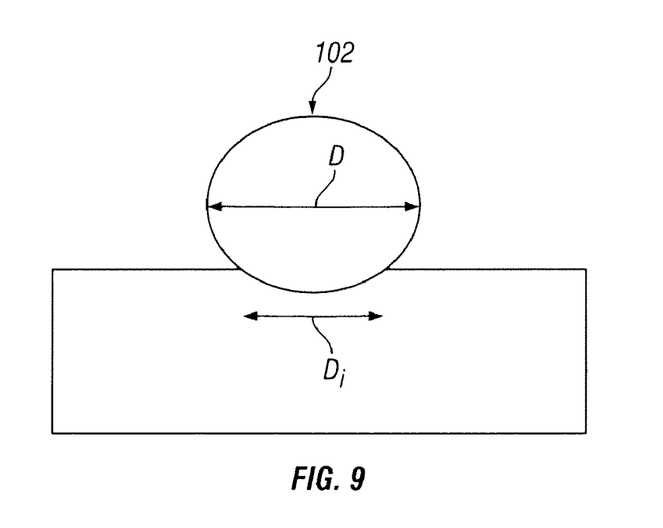
FIG. 9 illustrates the Brinell Hardness Test.

The diameter of the impression is the average of two readings at right angles and the use of a Brinell hardness number table can simplify the determination of the Brinell hardness. A well structured BHN reveals the test conditions, and looks like this, "75 HB 10/500/30" which means that a Brinell Hardness of 75 was obtained using a 10 mm diameter hardened steel with a 500 kilogram load applied for a period of 30 seconds. On tests of extremely hard metals a tungsten carbide ball is substituted for the steel ball. Compared to the other hardness test methods, the Brinell ball makes the deepest and widest indentation, so the test averages the hardness over a wider amount of material, which will more accurately account for multiple grain structures and any irregularities in the uniformity of the material. This method is the best for achieving the bulk or macro-hardness of a material, particularly those materials with heterogeneous structures. FIG. 9 illustrates the test, where 102 is the applied force.

For the following series of Quantitative BHN tests, the BHN was determined for samples of shale from the Haynesville and Woodford formations both dry and after exposure to various fluids. The data is given in Table 1 showing the BHN values for before and after exposure to the indicated fluids. The % retained hardness was calculated by dividing the post-exposure BHN by the pre-exposure BHN and multiplying that value by 100. The sample that was exposed to the HYBOR G fluid retained approximately 50% more of its initial "hardness" when compared to samples that were exposed to the other two fluids. "HYBOR G" is a delayed borate crosslinked guar fracturing fluid available from Halliburton Energy Services, Inc. in Duncan, Oklahoma. "FR-56" is a friction reducer available from Halliburton Energy Services, Inc. in Duncan, Okla. It is a liquid friction reducer that comprises an oil-water emulsion that is easily inverted or broken and dispersed with aqueous fluids. "DELTA 200" is a borate fracturing fluid available from Halliburton Energy Services, Inc. in Duncan, Okla., and is designed for use in wells having a bottomhole temperature of up to about 200° F.

TABLE 1

| Formation | Fluid | BHN (pre-) | BHN (post-) | % Retained Hardness |
|---|---|---|---|---|
| Haynesville | HYBOR G | 8.4 | 7.625 | 91 |
| Haynesville | Slickwater with a FR-56 friction reducer | 8.9 | 5.4 | 61 |
| Woodford | DELTA 200 (with no crosslinker) | 23 | 14 | 61 |

A possible explanation for the effects seen in Table I can be found if one looks at the pH of the various fluids. HYBOR G has a pH of 10.5, and the Slickwater and DELTA 200 fluids have pHs of about 7. It is possible that the more alkaline solution, coupled with divalent cations present in the formation mineralogy, served to give similar effects as lime strengthening of substrates. The effect of this hardening or reduction in hardening in a formation can best be visualized by looking at proppant embedment in soft formations.

For these qualitative Quad-Cell embedment tests, the Quad-Cell load frame may be used to evaluate proppant embedment and changes in the formation/proppant mineralogy after exposure to closure pressures and temperature similar to well conditions. Briefly, the experiment involves loading a wafer of shale of about a 2" diameter into the cell, placing proppant (slurried with the desired fluid) on top of the first wafer, and installing a second shale wafer on top. In effect, this replicates a shale fracture propped by a proppant and exposed to a treatment fluid. Closure stress is applied and the cell is heated to the desired temperature and held at these conditions for 2-4 weeks. After this time period, the sample is removed from the cell, impregnated with an epoxy, and thin sections are taken.

Figure 10A:
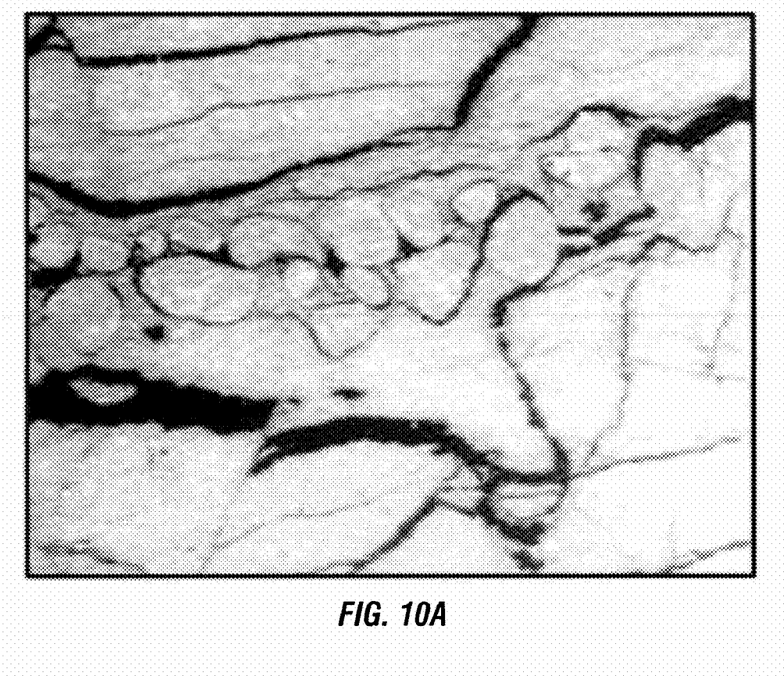
FIGS. 10A and 10B illustrate proppant embedment.
Figure 10B:
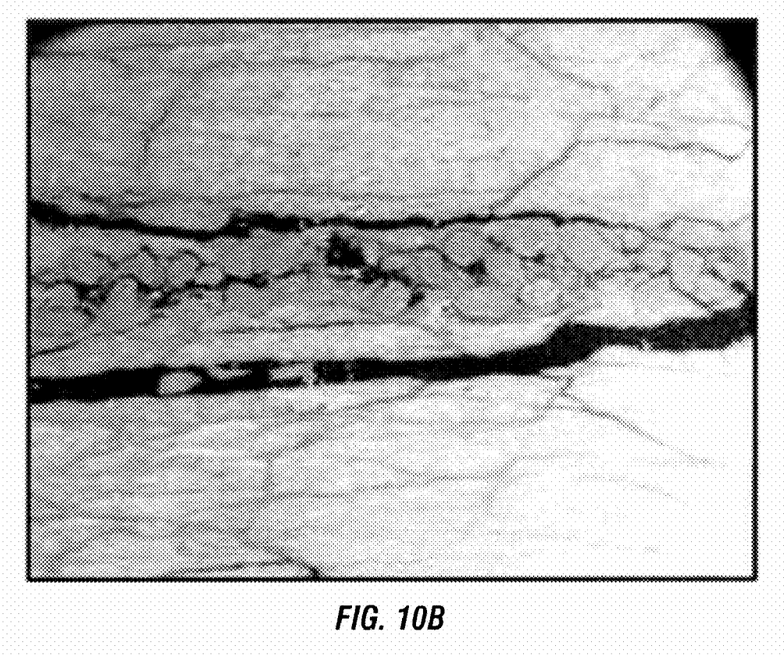

FIGS. 10A and 10B are scanning electron microscope ("SEM") photos of thin sections taken from a sample of the Woodford shale in which 0.5#/ft$^2$ of proppant has been placed with a 16/30 CRC slick water treatment comprising FR-56. The pack was placed in a load frame and approximately 7.5K psi closure pressure was applied at 200° F. for a period of 3 weeks. As can be seen in the thin sections, the proppant has in most cases been enveloped within the formation.

Figure 11A:
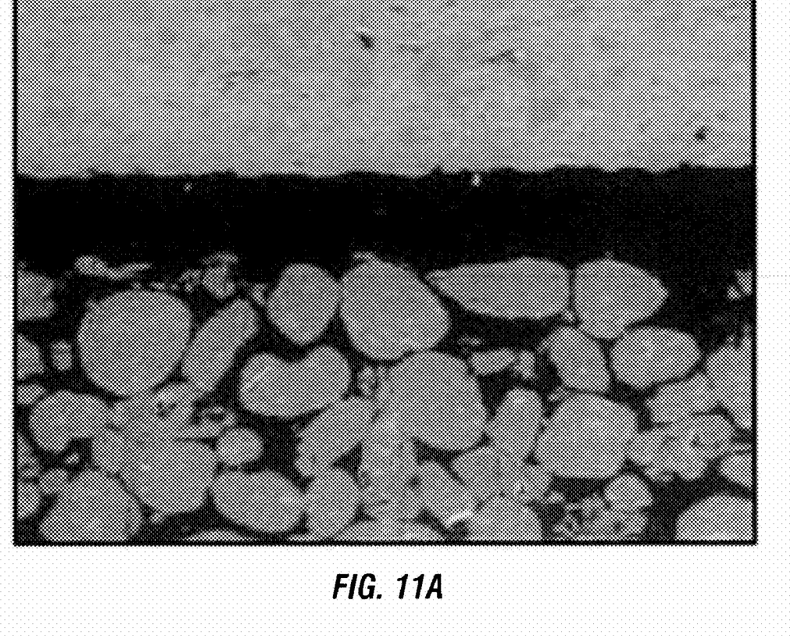
FIGS. 11A and 11B illustrate proppant embedment.
Figure 11B:
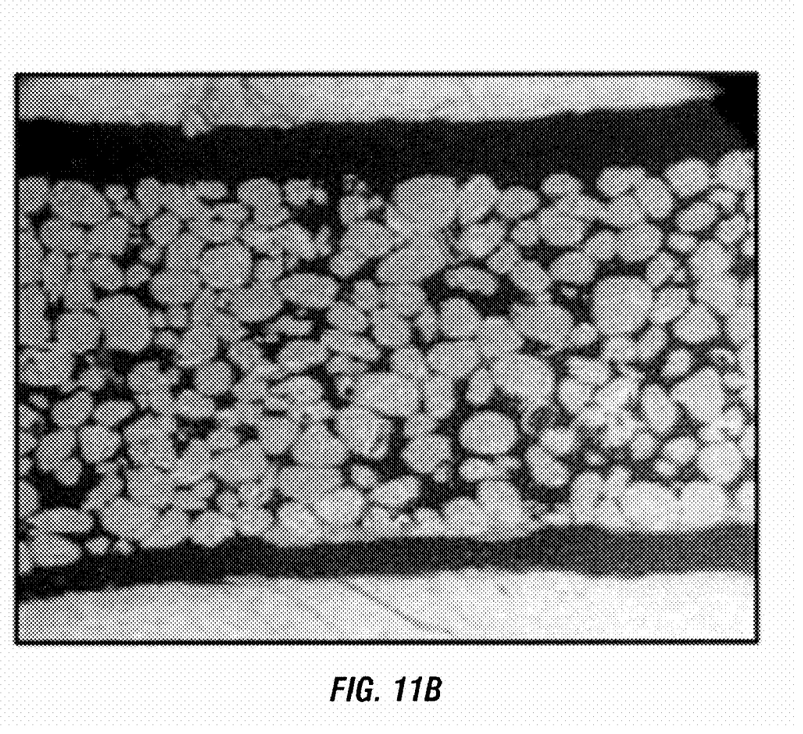

FIGS. 11A and 11B are also SEM photos of thin sections from a sample of Woodford shale, but now 2#/ft$^2$ of proppant is used with a HYBOR G fluid. Closure stress and temperature are the same as in the first test. Here there is little to no embedment of the proppant into the formation. Again, one explanation can be found in the differences in pH of the two treating fluids. In this sample of Woodford shale, there is both calcium and magnesium present.

These tests indicate that it is possible that a high pH treating fluid can minimize proppant embedment and fracture closure by modifying the surface of the fracture such that it increases or maintains its relative hardness after exposure to treating fluids.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing an aqueous-based fracturing fluid;
   placing the aqueous-based fracturing fluid into a subterranean formation;
   placing an erosion agent in the aqueous-based fracturing fluid and/or the subterranean formation;
   allowing a channel to form within a fracture network in the subterranean formation;
   providing a plasticity modification fluid that comprises an aqueous fluid and an alkaline embrittlement modification agent; wherein the embrittlement modification agent comprises a base chosen from the group consisting of: an amine; lithium hydroxide; sodium hydroxide; potassium hydroxide; rubidium hydroxide; calcium hydroxide; strontium hydroxide; barium hydroxide; sodium carbonate; lime; and any derivative or combination thereof;
   placing the plasticity modification fluid into a fracture in the fracture network in the subterranean formation; and
   embrittling at least one fracture face of the fracture to form an embrittled fracture face.

2. The method of claim 1 wherein the subterranean formation is a low permeability formation.

3. The method of claim 1 wherein the erosion agent comprises a fluid chosen from the group consisting of: fresh water, a brine, an acidic fluid, and any combination thereof.

4. The method of claim 1 wherein at least a plurality of erosive solids are added to the aqueous-based fracturing fluid.

5. The method of claim 1 further comprising flushing the fracture network with an untreated fluid before placing the plasticity modification fluid into a fracture in the fracture network in the subterranean formation.

6. The method of claim 1 wherein the erosion agent and the plasticity modification agent are added sequentially to the aqueous-based fracturing fluid before or at the point of injection of the aqueous-based fracturing fluid into the subterranean formation.

7. The method of claim 1 wherein the plasticity modification fluid comprises proppant particulates.

8. The method of claim 7 wherein at least a plurality of the proppant particulates are placed in the fracture in the fracture network.

9. The method of claim 1 further comprising forming a complex fracture system extending from the wellbore into the reservoir, the complex fracture system having eroded and propped flow channels along an embrittled fracture face.

10. The method of claim 1 wherein embrittled fracture face substantially prevents formation intrusion into the fracture.

11. A method comprising:
    providing a subterranean formation that comprises tight gas, a shale, a clay, and/or a coal bed;
    providing an aqueous-based fracturing fluid;
    placing the aqueous-based fracturing fluid into a subterranean formation;
    placing an erosion agent in the aqueous-based fracturing fluid and/or the subterranean formation;
    allowing a channel to form within a fracture network in the subterranean formation;

providing a plasticity modification fluid comprising an embrittlement modification agent; wherein the embrittlement modification agent comprises a base chosen from the group consisting of: an amine; lithium hydroxide; sodium hydroxide; potassium hydroxide; rubidium hydroxide; calcium hydroxide; strontium hydroxide; barium hydroxide; sodium carbonate; lime; and any derivative or combination thereof;

placing the plasticity modification fluid into a subterranean formation so as to form a treated portion of the formation; and embrittling a portion of the treated portion of the formation so that the treated portion has a retained hardness factor of at least 65% when tested using a Modified Brinell Hardness Test.

12. The method of claim 11 wherein the erosion agent is a fluid chosen from the group consisting of: fresh water, a brine, an acidic fluid, and any combination thereof.

13. The method of claim 11 further comprising flushing the fracture network with an untreated fluid before placing the plasticity modification fluid into a fracture in the fracture network in the subterranean formation.

14. The method of claim 11 wherein the erosion agent and the plasticity modification agent are added sequentially to the aqueous-based fracturing fluid before or at the point of injection of the aqueous-based fracturing fluid into the subterranean formation.

15. The method of claim 11 wherein the plasticity modification fluid comprises proppant particulates.

16. The method of claim 11 wherein the treated portion of the subterranean formation comprises at least one fracture.

17. The method of claim 16 wherein the treated portion comprises an embrittled fracture face that substantially prevents formation intrusion into the fracture.

18. A method comprising:
providing a selected portion of a subterranean formation that comprises tight gas, a shale, a clay, and/or a coal bed and having a first Young's modulus;
providing an aqueous-based fracturing fluid;
placing the aqueous-based fracturing fluid into the portion of the subterranean formation;
placing an erosion agent in the aqueous-based fracturing fluid and/or the portion of the subterranean formation;
allowing a channel to form within a fracture network in the portion of the subterranean formation;
providing a plasticity modification fluid comprising an embrittlement modification agent;
placing the plasticity modification fluid into the portion of the subterranean formation so as to treat the portion of the subterranean formation; and
embrittling at least one fracture face in the portion of the treated portion of the formation so that the treated portion has a second Young's modulus after treatment that is higher than the first Young's modulus.

19. The method of claim 18 wherein the erosion agent is a fluid chosen from the group consisting of: fresh water, a brine, an acidic fluid, and any combination thereof.

* * * * *